Patented Apr. 6, 1954

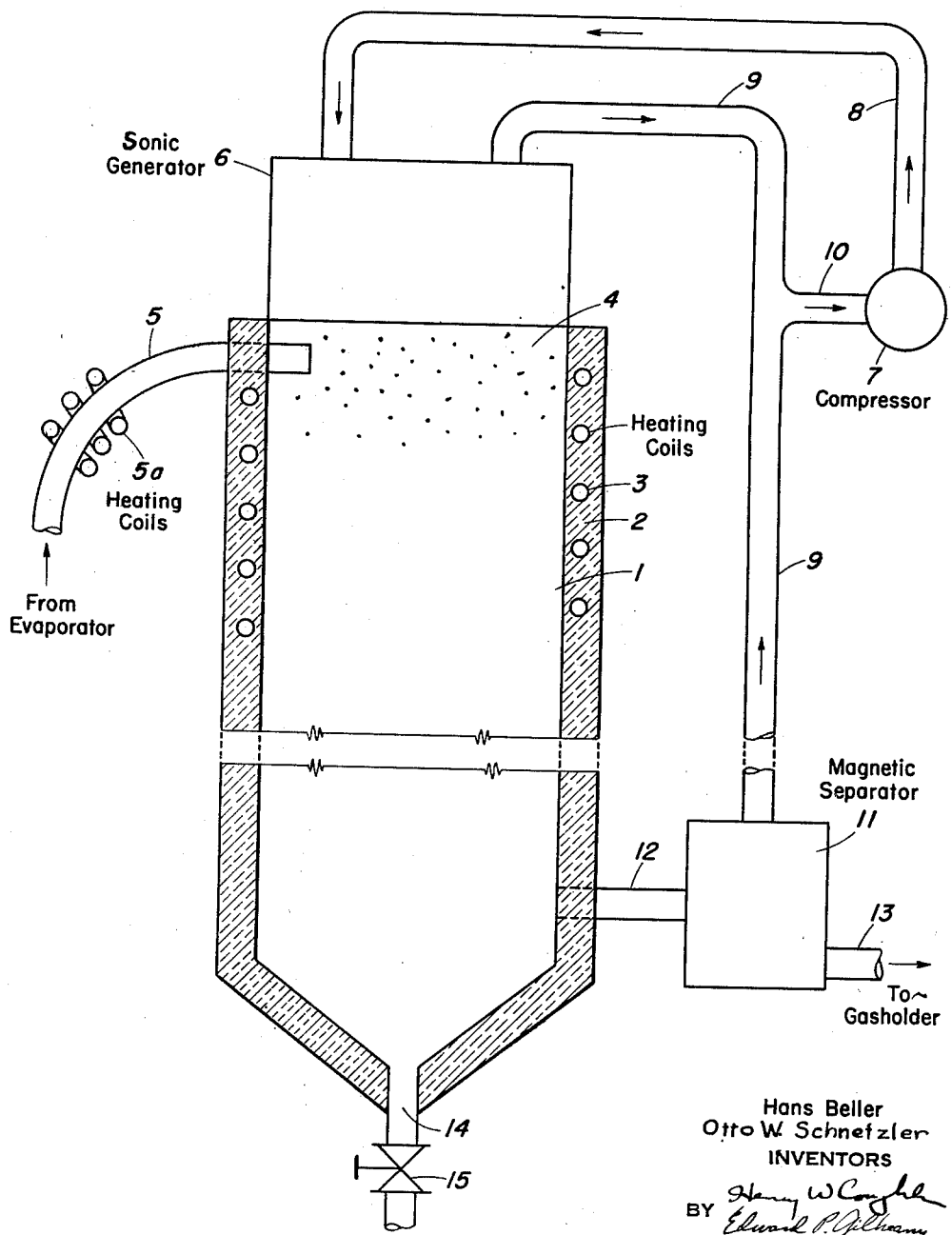

2,674,528

UNITED STATES PATENT OFFICE 2,674,528

PRODUCTION OF METAL CARBONYL POWDERS OF SMALL SIZE

Hans Beller, Cranford, and Otto W. Schnetzler, Maplewood, N. J., assignors to General Aniline & Film Corporation, New York, N. Y., a corporation of Delaware Application January 22, 1951, Serial No. 207,110

4 Claims. (Cl. 75—0.5)

The present invention relates to the production of metal powders of particularly small size by the thermal decomposition of metal carbonyls.

The decomposition of a metal carbonyl, such as the carbonyl of iron or nickel or mixtures thereof is described, for example, in United States Letters Patent 1,759,659 and 1,759,661, and is usually effected by introducing the carbonyl in its vaporized form into a heated vessel in such a manner that the decomposition takes place substantially in the free space of the vessel instead of by contact with the heated walls of the vessel. The metal carbonyl decomposes with the formation of carbon monoxide gas and finely divided metal which is conducted out of the decomposer space by the gas stream and is separated by mechanical, magnetic, or other means.

Metal powders, such as those of iron, nickel and cobalt, produced in this manner have a wide particle size distribution of say from 2 to 20 microns, and contain usually chemically combined carbon and oxygen, the amount of which is dependent primarily upon the temperature at which the decomposition of the carbonyl is carried out. For example, at a decomposition temperature of from 250° to 300° C., the carbon content of the iron powder produced may amount to .9% to 1.2% and above.

One of the most promising applications of finely divided metal powders lies in the electronic field as magnetic materials. Recent developments in the use of such magnetic materials have shown that besides a suitable carbon content, the size of the individual metal particles as well as the particle size distribution of a mixture of such particles are of the greatest importance for the performance in electric devices, particularly in the high frequency and ultra-high frequency field. For applications in the range of say 10 to 50 megacycles and above, iron particles having a diameter of 3 to 4 microns or less perform satisfactorily, whereas the performance of particles with an average diameter of 6 to 8 microns is inferior. Particles with even larger diameters are of little utility for high frequency work.

As the metal carbonyl decomposition process has been heretofore operated, it invariably led to mixtures having a large percentage of oversized particles, i. e., particle sizes having a diameter of 12 microns or above. This is not surprising when one considers the mechanism of decomposition. Thus the carbonyl vapor enters the hot zone and becomes heated therein. Those molecules which occupy the more favorable position receive heat faster than others and will, accordingly, decompose first with the formation of metal nuclei. Once a certain number of nuclei have formed, the vapor will decompose on the nuclei and contribute to their growth in preference to forming new nuclei. This is attributable to the fact that the initially formed nuclei will receive more radiant heat than the carbonyl vapor due to their much higher absorption coefficients, and thus become sources of heat for neighboring vapor molecules which will decompose on contact with them.

Considerable effort had been made in the past to separate such mixtures of particles of widely different sizes into suitable fractions to remove the undesirable particles above a certain maximum size. However, no improvements have been devised for the decomposition process itself which would automatically eliminate the formation of oversized particles or result in powders of a definite, desired particle size. As a matter of fact, the art had about concluded that the only way to obtain uniform particles of the desired size was by the fractionation method.

We have now found that the thermal decomposition of metal carbonyls can be effected to yield metal powders with a closely controlled particle size distribution and of a particle size ranging from about .1 to 1.5 microns in diameter, by an artificial increase in the number of particle nuclei per unit quantity of metal carbonyl. This increase is achieved according to our invention by applying a sonic or ultrasonic field to the decomposition space of a metal carbonyl reactor for the purpose of supplying energy capable of producing an initial decomposition of a large number of carbonyl vapor molecules, which subsequently act as nuclei, upon which the carbonyl vapor thermally decomposes, i. e. centers of further decompositions. In other words, our procedure envisages the thermal decomposition of the metal carbonyl onto nuclei produced from energy supplied through the application of a sonic field.

The preparation of carbonyl metal powders of extremely small diameter and of uniform size distribution by the initial simultaneous decomposition of a large number of carbonyl vapor molecules, by the application to the decomposition space of a sonic or ultrasonic field, constitutes the purposes and objects of the present invention.

The decomposition of the metal carbonyl which may be of any metal having electromagnetic properties, such as iron, cobalt, nickel and molybdenum, is effected in the free space of a metal tower having a height of about 16 ft. and a diameter of about 3 ft. Such decomposition is effected at a temperature ranging from about 470 to 490° F. This temperature is provided by means of heating coils located in the walls of the reactor, through which a heating medium is circulated. The rate of feed of the metal carbonyl to the reactor is about 5 cubic ft. or 625 grams per minute.

The supply of nuclei upon which the carbonyl metal builds is provided for by applying a sonic or ultrasonic generator of the siren type, to the top of the reactor. This generator may be of the U-3 type, which is manufactured and sold by the Ultrasonic Corporation of Cambridge, Mass.

Such generators comprise a rotor facing a stator, with precision matched ports around the periphery of each. Compressed carbon monoxide is passed through the ports of the rotor and then of the stator. As the rotor turns, alternately opening and closing the ports of the stator, the gas flows out intermittently through the stator ports. An intense sound wave is thereby created and is directed from the generator into the decomposition space of the metal carbonyl reactor.

The incoming metal carbonyl vapor is traversed by the sound wave, and as a result undergoes a periodic adiabatic increase in temperature. These local temperature rises operate upon the metal carbonyl and consequently cause its decomposition. Thus the number of particles formed is a multiple of those which would be formed were decomposition effected only by the heat supplied by the heating coils.

The invention is further illustrated in the accompanying drawing in which the figure is a diagrammatic section, partly cut away, of a front elevation of a reactor equipped with a sonic generator.

Referring to the drawing, the reactor indicated by reference number 1 comprises a steel tower of the aforestated dimensions, said tower having a conical bottom and being provided with heat insulation 2 and coils 3 for supplying heat to raise the reaction zone indicated by reference number 4 to the desired temperature. Near the top of reactor 1 is a line 5 leading from a metal carbonyl evaporator (not shown), and serving to conduct metal carbonyl vapor to the reactor. Preferably, line 5 is provided with heating coils 5a.

Mounted in the top of the reactor 1 is the sonic generator 6 of the type previously mentioned. The sonic generator is provided with line 8 serving to carry to the generator, carbon monoxide which is compressed in compressor 7. Leading from the sonic generator is line 9 which carries carbon monoxide from the generator and returns it to the compressor through line 10.

The reactor is provided near the bottom thereof with line 12 leading to a magnetic separator 11 which is in turn connected with line 9 and line 13. Line 12 serves to conduct carbon monoxide produced partly from the decomposition of the metal carbonyl and some carbonyl metal entrained therein, to the separator 11. The carbon monoxide separated from the metal in separator 11 is recycled in part to the compressor through lines 9 and 10, while the balance is led away through line 13 to a gas holder.

The coned bottom of the reactor is provided with an opening 14 controlled by valve 15 for withdrawal of carbonyl metal.

The following example, when taken in connection with the drawing, will serve to further illustrate the invention:

The reaction space 4 of reactor 1 is heated to a temperature ranging from 470 to 490° F. by heating fluid circulated through coils 3. Iron pentacarbonyl is vaporized and fed through line 5 into reactor 1 at a rate of 5 cubic ft. per minute.

Carbon monoxide, compressed in compressor 7, is fed through line 8 into the sonic generator 6 at the rate of 1200 cubic ft. per minute. At such feed rate, the sonic generator has an output of 10 kilowatts of acoustic power of a frequency of 3 kilocycles. 1150 cubic ft. per minute of carbon monoxide is recycled directly from the generator to the compressor, while 50 cubic ft. per minute is recycled to the compressor from the magnetic separator through lines 9 and 10. 25 cubic ft. per minute flow to the gas holder.

The sonic field resulting from the movement of the carbon monoxide through the sonic generator causes sound waves to penetrate into the decomposition chamber. The periodic increase in adiabatic temperature due to the sound waves amounts to about 10 to 20° F. The incoming iron pentacarbonyl vapor is thus subjected to local, well-distributed temperature rises leading to decomposition. The number of particles formed is, therefore, greatly increased over the number which would be formed from thermal decomposition occasioned by the heat supplied through the heating coils.

One-third of the iron particles formed in the reaction drop out of the gas stream at the bottom of the reactor. The remaining particles of iron and the carbon monoxide resulting from the decomposition pass through line 12 into magnetic separator 11. The carbon monoxide from the separator is recycled through lines 9 and 10 to the compressor 7. The carbonyl iron is retained in the magnetic separator, from which it may be periodically removed.

The iron powder which is recovered is milled in order to break up clusters or agglomerates which tend to form and which would reduce the overall electromagnetic properties of the powders. The final powder has particles whose number-average diameter is .5 micron, whose maximum diameter is 1.5 microns and whose minimum diameter is .1 micron.

The powder obtained and having the above particle sizes has many electromagnetic advantages. One such advantage is a very low eddy current loss, which insures high efficiency or high Q values when the powder is used in the form of electromagnetic cores at high frequencies. The reduction of these losses is directly attributable to the reduction of particle size achieved by our process.

Various modifications of the invention will be apparent to operators in this field. Thus, in lieu of iron pentacarbonyl, our procedure may use, with equal effectiveness, nickel carbonyl, cobalt carbonyl or molybdenum carbonyl. In addition, other sonic generators of the siren type, other than the specific one mentioned above, may be employed. We, therefore, do not intend to be limited in the patent granted, except as necessitated by the prior art and the appended claims.

I claim:

1. The process of producing carbonyl metals of a very small particle size and uniform size distribution, which comprises thermally decomposing a metal carbonyl in the free space of a reactor while subjecting the metal carbonyl to the action of sound waves adjusted to cause local temperature rises of from about 10 to 20° F.

2. The process as defined in claim 1, wherein the metal carbonyl is iron carbonyl.

3. The process as defined in claim 1 wherein the reactor is heated to a temperature ranging from 470 to 490° F.

4. The process of producing carbonyl metals of a very small particle size and uniform size distribution which comprises thermally decomposing a metal carbonyl in the free space of a reactor while subjecting the metal carbonyl, directly after its admission into the reactor, to the action of sound waves emanating from a sonic generator to effect an initial decomposition of a large number of metal carbonyl molecules to provide nuclei upon which the metal carbonyl vapor thermally decomposes and whereby said sound waves produce an adiabatic temperature rise of about 10 to 20° F.

References Cited in the file of this patent

UNITED STATES PATENTS

| Number | Name | Date |
|---|---|---|
| 1,759,661 | Muller et al. | May 20, 1930 |
| 1,980,171 | Amy | Nov. 13, 1934 |
| 2,251,959 | Smith | Aug. 12, 1941 |

OTHER REFERENCES

"Ultrasonics," page 222, Edited by Bergmann. Published in 1949 by John Wiley and Sons, New York.